US012562961B2

(12) United States Patent

Baumeister et al.

(10) Patent No.: US 12,562,961 B2

(45) Date of Patent: Feb. 24, 2026

(54) OPERATING AN AUTOMATION SYSTEM OF A MACHINE OR AN INSTALLATION

(71) Applicant: Lenze SE, Aerzen (DE)

(72) Inventors: Christoph Baumeister, Wollbach (DE); Daniel Brosche, Bad Muender (DE); Jens Bories, Bielefeld (DE)

(73) Assignee: Lenze SE, Aerzen (DE)

( * ) Notice: Subject to any disclaimer, the term of this patent is extended or adjusted under 35 U.S.C. 154(b) by 0 days.

(21) Appl. No.: 18/033,143

(22) PCT Filed: Oct. 21, 2021

(86) PCT No.: PCT/EP2021/079220

§ 371 (c)(1),
(2) Date: Apr. 21, 2023

(87) PCT Pub. No.: WO2022/084452

PCT Pub. Date: Apr. 28, 2022

(65) Prior Publication Data

US 2023/0396500 A1 Dec. 7, 2023

(30) Foreign Application Priority Data

Oct. 21, 2020 (DE) .......................... 102020127756.3

(51) Int. Cl.
*H04L 41/08* (2022.01)
*H04L 41/0869* (2022.01)

(52) U.S. Cl.
CPC ...... *H04L 41/0886* (2013.01); *H04L 41/0869* (2013.01)

(58) Field of Classification Search
CPC ........................ H04L 41/0886; H04L 41/0869
See application file for complete search history.

(56) References Cited

U.S. PATENT DOCUMENTS

| | | | |
|---|---|---|---|
| 2005/0097165 A1* | 5/2005 | Lahtinen ........... | G05B 19/4186 |
| | | | 709/227 |
| 2008/0097622 A1* | 4/2008 | Forney ................. | G06F 16/954 |
| | | | 700/1 |

(Continued)

OTHER PUBLICATIONS

Steindl, G., Frühwirth, T., & Kastner, W. (Sep. 2019). Ontology-based opc ua data access via custom property functions. In 2019 24th IEEE International Conference on Emerging Technologies and Factory Automation (ETFA) (pp. 95-101). IEEE. (Year: 2019).*

(Continued)

*Primary Examiner* — John A Follansbee
*Assistant Examiner* — Zonghua Du
(74) *Attorney, Agent, or Firm* — Westborough IP Group, LLC

(57) ABSTRACT

An automation system of a machine or an installation includes an automation device that is accessed by a client via a server. Address information for access operations is provided by the server in an address space in the form of data objects that are organized in the form of nodes of a meshed network in an information model of the server. Depending on a technical task to be performed, the client, by calling a functionality offered by the server, generates data objects on the server that allow the client to perform the access operations to the automation device and/or to at least one field device networked with the server via a fieldbus that are necessary to achieve the technical task.

25 Claims, 3 Drawing Sheets

(56) References Cited

U.S. PATENT DOCUMENTS

| | | | | |
|---|---|---|---|---|
| 2009/0013082 A1* | 1/2009 | Nara | G05B 15/02 | |
| | | | 709/228 | |
| 2012/0089239 A1* | 4/2012 | Sentgeorge | G05B 19/4185 | |
| | | | 700/2 | |
| 2013/0063449 A1* | 3/2013 | Leitner | G05B 19/4185 | |
| | | | 345/501 | |
| 2014/0040431 A1* | 2/2014 | Rao | G06F 16/2282 | |
| | | | 709/219 | |
| 2015/0012141 A1* | 1/2015 | Schulz | G05B 11/01 | |
| | | | 700/275 | |
| 2016/0266566 A1* | 9/2016 | Lutz | G05B 19/056 | |
| 2017/0337051 A1* | 11/2017 | Bertani | H04L 61/5046 | |
| 2019/0356550 A1* | 11/2019 | Stanciu | H04L 41/0866 | |
| 2020/0192319 A1* | 6/2020 | Ong | G10L 17/22 | |
| 2020/0277847 A1* | 9/2020 | Rojas | G06Q 10/20 | |
| 2020/0304567 A1* | 9/2020 | Asikainen | H04L 67/01 | |
| 2021/0344566 A1* | 11/2021 | Mayer | H04L 51/046 | |
| 2022/0255987 A1* | 8/2022 | Goldstein | G05B 19/05 | |
| 2023/0034951 A1* | 2/2023 | Talanis | H04L 41/0869 | |

OTHER PUBLICATIONS

Mühlbauer et al. (2021): Feature-based Comparison of Open Source OPC-UA Implementations. INFORMATIK 2020. DOI: 10.18420/inf2020_34. Gesellschaft für Informatik, Bonn. PISSN: 1617-5468. ISBN: 978-3-88579-701-2. pp. 367-377. 5th GI/ACM I4.0Standardization Workshop. Sep. 28-Oct. 2, 2020 (Year: 2020).*

Wolfgang Mahnke, et al., OPC Unified Architecture, Heidelberg (DE) 2009, Chapter 14.1, p. 311, XP-002670634.

Tobias Straub, "Design and implementation of a cross-platform prototypical application for retrieving, visualizing and modifying data using the OPC Unified Architecture known in Industrie 4.0, taking into account established device integration standards using Field Device Tool as an example," Hochschule Furtwangen University, 2016, S. 1-179, Aug. 27, 2016, https://d-nb.info/1184382719/34.

Udo Enste, et al., "OPC Unified Architecture," 2011, vol. 59, Nr. 7, S. 397-404, DOI: https://doi.org/10.1524/auto.2011.0934, De Gruyter.

Wikipedia, "Open Platform Communications," Aug. 5, 2020.

* cited by examiner

OPERATING AN AUTOMATION SYSTEM OF A MACHINE OR AN INSTALLATION

TECHNICAL FIELD

The system described herein relates to operating an automation system of a machine or an installation and more particularly to operating an automation system having an automation device that is accessed by a client via a server.

BACKGROUND

Nowadays, machines and/or installations often have automation systems that enable the machine and/or installation to be able to perform technical tasks without the need for direct operator interventions to control the installation. Rather, the automation system enables the machine and/or installation to handle technical tasks, such as the processing of a workpiece, independently or at least largely independently. Such automation systems typically allow the operator to intervene in the operation of the machine and/or installation in order to directly and/or indirectly influence the operation procedure.

Direct influence is to be understood here in particular to mean direct control interventions such as would typically be necessary for manual control of the machine and/or installation in the absence of an automation system. Modern automation systems nevertheless provide these facilities in order to enable direct manual intervention in certain situations, such as an emergency stop function. In addition, modern automation systems also enable interventions in the operation of the machine or installation that indirectly affect operation of the machine or installation, for example by triggering entire chains of actions, defining events in which actions are carried out, or specifying parameters for an operation that is controlled by the automation system automatically. For example, if the automation system contains a control system, control parameters can be specified by an operator. The actual control is then carried out by the automation system using the specified control parameters. The operator can also specify, for example, that when a certain value of a temperature measured by a temperature sensor is exceeded, the automation system performs a certain function, for example, issues a warning, limits performance, or performs an emergency shutdown.

Performing a certain function is accomplished in particular by automation devices which enable the automation of the operation of the machine and/or installation, for example using an embedded computer. The embedded computer may be, for example, a control device for a drive system, such as a programmable logic controller and/or a servo controller, which is used to control servo motors.

For simple machines and/or installations with a low degree of automation, such automation devices are typically accessed by the operator via a user interface of the automation device. For example, the user interface can be a display with a keypad that can be used to enter commands and output information. However, for reasons related to automation technology, such solutions can only have limited capabilities, e.g. the solutions require immediate proximity of the operator to the automation device. The automation device itself may also be comparatively complex if the automation device has to have a dedicated user interface in order to address the function provided by the automation device.

In more advanced automation systems, the automation device is therefore accessed from a client via a server. The client can be, for example, a piece of software that is executed on a computer, for example a process master computer. The server can also be deployed using software running on a computer. The computer providing the server may be, for example, an embedded computer in a control device of a drive system. However, the computer providing the server can also be a computer connected to the automation device via a data link. Such automation systems make it possible in particular to use automation devices from different commercial vendors in a machine and/or installation and to access the respective automation device from the client via the server. The server enables the client to communicate with the server via a standardized and, in particular, vendor-independent communication standard. The server can then have drivers specific to the automation device that allow access to the automation device via the server. Such a communication standard is, for example, OPC (Open Platform Communication), with, in particular, the OPC Unified Architecture (OPC UA) being a suitable communication standard for implementing such an automation system.

In the automation systems described above, the server provides the address information required for the access operations in an address space in the form of data objects. The address information allows the client to access the automation device via the server, for example, to trigger a specific action of the automation device and/or to change a technical parameter of the automation device. In the information model of the server, the data objects are organized as nodes of a meshed network. Meshed networks have some advantages over hierarchical structures. For example, real-world relationships can be better represented, certain use cases, e.g., role-based views, can be implemented more easily, the information model can be better maintained, and storage space is saved.

However, the disadvantage is that such an information model, which the server must provide, contains a large number of data objects. In principle, all functions and technical parameters of the automation device are described by corresponding data objects in the information model of the server in compliance with the communication standard, so that the client can access the corresponding functions and/or technical parameters of the automation device via the server. In particular, if the server is operated on an embedded computer of a control device, for example a programmable logic controller, this can already present a challenge for the hardware resources of the embedded computer. This is due partly to the fact that such embedded computers often have very limited hardware resources. To make matters worse, significant real-time requirements often apply during operation of a control device. The significant real-time requirements require a correspondingly high operating speed of the server also, so that the real-time requirements that arise during the operation of the automation system can be met.

In addition, other field devices, such as sensors and/or actuators, are often networked with the automation device and/or the server using a fieldbus. In such cases, the information model of the server also contains data objects that contain address information for access operations to the field devices networked with the server and/or the automation device. This allows the client also to access the field devices using the communication standard. The server then accesses the field device via the fieldbus using a software interface specific to the field device. It can be seen that with each field device that is connected to the server and/or the automation device, the complexity of the information model or the number of data objects provided by the server, and thus the scope of the address space, increases accordingly. Accordingly, the load on the computer running the server also increases. In addition, configuring such a server for an automation system with a corresponding number of field devices networked with the server and/or the to automation device via a fieldbus is also complex. Finally, the address space provided by the server must include all the data objects necessary to describe all the addressable functions and/or parameters of the field devices, which will result in a corresponding increase in the hardware resources required by the computer running the server.

SUMMARY OF THE INVENTION

It is desirable to operate an automation system in which the disadvantages described above do not occur at all or at least to a reduced extent and to reduce the need for hardware resources for operating the server.

The system described herein provides that, based on a technical task to be performed, the client, by calling a functionality offered by the server, generates data objects on the server that allow the client to perform access operations to the automation device and/or to at least one field device, networked with the server and/or the automation device via a field bus, that are necessary to achieve the technical tasks. The functionality can be a service, in particular an OPC UA service. Alternatively and/or in addition, the functionality may be a method, in particular an OPC UA method, which is represented in the information model of the server as a node in the meshed network.

The system described herein also offers other advantages. For example, it is not necessary to perform a classical update of the entire server when the machine or technical installation is changed. Rather, it is sufficient to generate required data objects using the system described herein. In this way, it is even possible to integrate components into the machine or technical installation about which no information was available at the time of implementation of the server, for example, because the information simply did not exist at the time of implementation.

It is particularly relevant that the generation of the data objects depends on a technical task to be performed. The technical task can be, for example, a maintenance or a commissioning operation. The technical task may also be a technical task related to the regular operation of the machine and/or installation. For example, the technical task may be the, in particular repeated, production of a particular product or the performance of a particular, in particular repeated, work procedure. It has turned out that the performance of a specific technical task with the machine and/or installation and/or a normal operation does not normally require the complete information model, in which the address space contains address information in the form of data objects that refer to all functions and/or parameters of the automation device and/or field devices networked with the server and/or the automation device. It is therefore sufficient to provide in the address space only the address information corresponding to data objects that are actually required to handle the technical task currently to be performed.

The server therefore may not need to provide the entire address information in the address space that the automation system would have to contain in order for the client to be able to access all functions and/or technical parameters of the automation device and/or of the at least one field device networked with the server and/or the automation device via a fieldbus using the address information. Instead, at the beginning of execution, the server has, or has access to, an incomplete information model, for example, an incomplete OPC UA information model of the automation system. In particular, at the beginning of execution, the information model of the server does not contain address information relating to functions and/or technical parameters of the automation device and/or the at least one field device. Instead, the server offers access to server functionalities that can be called up by the client and enable the data objects necessary to achieve the technical task to be created on the server. The functionalities involved can be services, in particular OPC UA services. Alternatively and/or in addition, the functionalities may be methods, in particular OPC UA methods, which are represented in the information model of the server as nodes in the meshed network.

The data objects are organized in the information model of the server as nodes of a meshed network. This means that the data objects can contain references to other data objects, such as references of an OPC UA information model. In particular, the data objects represent nodes of a fully meshed network or are organized as such. Such data objects are therefore also referred to as "nodes". For example, data objects can be OPC UA nodes. The data objects can be organized in specific classes, such as OPC UA node classes. One of the classes can be a class for types of functionality to be performed by the server. For example, in the case of an OPC UA server, data objects of a class for types of functionality to be performed by the server are called nodes of the "Methods" class.

In particular, the functionality offered by the server for generating data objects on the server can be an OPC UA method and/or an OPC UA service, for example, the OPC UA "AddNodes" service. Such a method or service makes it possible to create a data object, in particular an OPC UA node, on the server. The node generated can be, in particular, a node of the class "Variable", which describes a technical parameter and/or the value of a technical parameter.

The data objects can contain attributes that describe the properties of the data object. The attributes that a data object of a particular class can contain are defined in particular in the communication standard which the client uses to access the server, for example OPC UA.

By calling a functionality offered by the server, the client preferably receives a return value from the server with information about the type and/or address of the automation device. The functionality offered by the server is called in particular before the client, by calling the corresponding functionality offered by the server, generates data objects on the server which enable the client to perform the access operations to the at least one field device that are necessary for achieving the technical task. This functionality offered by the server can also be an OPC-UA method and/or an OPC UA service.

By calling a functionality offered by the server, the client preferably receives a return value from the server with information about the type and/or address of the at least one field device in the fieldbus. In particular, by calling the functionality offered by the server, the client receives return values with information about the types and/or addresses of all field devices in the fieldbus. The functionality offered by the server is called in particular before the client, by calling the corresponding functionality offered by the server, generates data objects on the server which enable the client to perform the access operations to the at least one field device that are necessary to achieve the technical task. The functionality offered by the server can also be an OPC-UA method. For example, the functionality may be a method offered as an OPC UA node of the Method type and containing a reference to a data object that represents the desired fieldbus interface. For example, the data object can be an OPC UA node of the "Object" class. As a result, the return values that the client receives contain the information about the type and address of the at least one field device in the fieldbus.

In particular, the system described herein provides that the client obtains data matching the type of the automation device and/or the at least one field device from a data source. The data includes in particular information about addressable technical parameters and/or technical functions of the automation device and/or the field device. Obtaining data takes place in particular after the client has received information about the automation device and/or about the type and/or address of the at least one field device by calling the corresponding functionality offered by the server. In particular, the data is obtained from the data source before the client generates data objects on the server by calling the corresponding functionality offered by the server.

The data source can be an internal resource of the computer on which the client is operated. Alternatively and/or in addition, it is also possible that the client accesses a data source remote from the computer on which the client is operated using a data link, for example via the internet. In this way, it is possible for the client to access and obtain a virtually unlimited amount of data relating to an equally virtually unlimited set of automation devices and/or field devices. In addition, the data can easily be made available in an updated version without the need for regular updates of data provided via an internal resource of the computer.

In many cases, however, it is not possible for the client to obtain the information about the type and/or address of a connected field device by calling a functionality offered by the server, in particular as described above. In particular in such cases, the system described herein may provide that the client determines the type and/or address of the field device using an iterative technique.

In particular, the iterative technique provides that data objects are generated by the client on the server which are suitable for enabling access to a field device of at least one specific type. The client can then check whether the at least one field device is a field device of the at least one type by calling up the data objects for test purposes. The data objects are in particular data objects that cause a read access to the field device when called by the client. In particular, the data objects are data objects which, when called by the client, cause a read access of device information of the field device, relating in particular to the type of the field device. In particular, the system described herein provides that the client analyzes the return value that the client receives in response to the call and, depending on the result of the analysis, identifies the type of the field device or at least restricts the field device to a specific set of possible types.

In particular, if the result of the check does not allow for a unique identification or at least a sufficient restriction of the type of the field device, the system described herein can provide that the client removes the data objects and replaces the data objects with other data objects that are suitable for enabling access to a field device of at least one further specific type, and repeats the check. This can be repeated, in particular, until the type of the field device can be uniquely identified or the possible type of the field device is sufficiently restricted. Sufficient restriction is to be understood in particular as a restriction which limits the set of possible types of the field device to such an extent that no further distinction is necessary for proceeding and, in particular, for achieving the technical task.

Alternatively and/or in addition, it may be the case that the system described herein can provide that the client determines the type of the fieldbus using an iterative technique. This is particularly advantageous if the server does not offer the facility to obtain the information about the type of the fieldbus by calling a functionality offered by the server.

In particular, the iterative technique provides that data objects are generated by the client on the server which are suitable for enabling access to an automation device with connection to a fieldbus of a specific type and/or to a field device via a fieldbus of the at least one specific type. The client can then check whether the at least one fieldbus is a fieldbus of the at least one type by calling up the data objects for test purposes. In particular, the data objects are data objects which, when called by the client, cause a read access to the automation device and/or a read access to a field device via the fieldbus. In particular, the data objects are data objects which, when called by the client, cause a read access of device information of the automation device and/or the field device, relating in particular to the type of the fieldbus. In particular, the system described herein provides that the client analyzes the return value that the client receives in response to the call and, depending on the result of the analysis, identifies the type of the fieldbus or at least restricts the device to a specific set of possible types.

In particular, if the result of the check does not allow for a unique identification or at least a sufficient restriction of the type of the fieldbus, the system described herein can provide that the client removes the data objects and replaces the data objects with other data objects that are suitable for enabling access to an automation device with connection to a fieldbus of at least one further specific type and/or to a field device via a fieldbus of the at least one further specific type, and repeats the check. This can be repeated, in particular, until the type of the fieldbus can be uniquely identified or the possible type of the fieldbus is sufficiently restricted. Sufficient restriction is to be understood in particular as a restriction which limits the set of possible types of the fieldbus to such an extent that no further distinction is necessary for proceeding and, in particular, for achieving the technical task.

Alternatively and/or in addition, it may be the case that the system described herein provides that the client determines the version of a firmware of the at least one field device using an iterative technique. This is particularly advantageous if the server does not offer the facility to obtain the information about the type of the firmware by calling a functionality offered by the server.

In particular, the iterative technique provides that data objects are generated by the client on the server which are suitable for enabling access to a field device with firmware of at least one specific version. The client can then check whether the firmware of the at least one field device is firmware of the at least one version, by calling up the data objects for test purposes. The data objects are in particular data objects that cause a read access to the field device when called by the client. In particular, the data objects are data objects which, when called by the client, cause a read access to device information of the field device, the device information relating in particular to the version of the firmware. In particular, the system described herein provides that the client analyzes the return value that the client receives in response to the call and, depending on the result of the analysis, identifies the version of the firmware or at least restricts the version to a specific set of possible types.

In particular, if the result of the check does not allow for a unique identification or at least a sufficient restriction of the version of the firmware, the system described herein can provide that the client removes the data objects and replaces the data objects with other data objects that are suitable for enabling access to a field device with at least one further specific version of the firmware, and repeats the check. This can be repeated, in particular, until the type of the version of the firmware can be uniquely identified or the possible version of the firmware is sufficiently restricted. Sufficient restriction is to be understood in particular as a restriction which limits the set of possible versions of the firmware to such an extent that no further distinction is necessary for proceeding and, in particular, for achieving the technical task.

In particular, the client may be configured for the automated execution of the iterative techniques described above. The iterative techniques described above may provide that the client relies upon predefined decision trees that contain information about which data objects will need to be generated on the server for the purpose of continuing the iterative techniques, depending on the result of the check in the previous checking step, in particular the result of the analysis of the corresponding return value.

This type of "trial and error" mechanism allows the client to determine what type of field device, fieldbus and/or firmware version is present, even if the server does not provide the appropriate functionality to do so. The system described herein is thus also applicable to automation systems that do not offer the appropriate functionalities to identify the type of the field device, the fieldbus, and/or the firmware version.

The data obtained enables the client to create the appropriate data objects using the functionality offered by the server. In particular, the data contains information that enables the client, when the server functionality for generating the data objects is called, to automatically transfer the necessary parameters that the functionality offered by the server requires in order to create the data objects in the address space of the server. The parameters transferred can be, for example, an identification of the fieldbus interface and/or a parameter interface of the automation device. The parameters transferred can also be the address of the technical parameter in the respective interface, its index, sub-index and/or data type.

The transfer of the parameters allows, for example, an OPC UA node of the "Variable" type to be created in the address space of the server, which represents the technical parameter and/or the technical function to be accessed and which contains references to other OPC UA nodes and attributes, which enable the client to access the represented technical parameter and/or technical function of the automation device and/or field device by accessing the created OPC UA node of the "Variable" class. In particular, the transfer of parameters enables the access by the client to be routed to the relevant technical resources of the automation device and/or the field device.

In particular, the client is configured to automatically evaluate the data obtained with regard to the parameters to be transferred when calling the server functionality for generating the data objects. The client being configured to automatically evaluate the data enables the generation of data objects on the server by the client to be extensively automated, so that in the ideal case no in-depth knowledge of the components of the automation system is required on the part of the operator of the client.

In particular, the client carries out a determination and/or selection of the data objects to be generated depending on the technical task, the data obtained, or a user input.

In particular, the client is configured to determine and/or select automatically, depending on the technical task, the data objects that must be generated on the server in order to achieve the technical task. For this purpose, the client can rely in particular on data containing information about predefined technical tasks. The definitions of predefined technical tasks may be, for example, information about the technical parameters and/or technical functions of the machine and/or installation that are accessed to achieve the technical task. For example, it may be necessary to monitor a particular temperature during the operation of the machine and/or installation in order to achieve a specific task. The data containing information regarding the technical task would then contain the information that the temperature should be monitored. The information enables the client to identify the data objects that are necessary to access the temperature and, in particular, to generate the necessary data objects on the server by using the data obtained with information about addressable technical parameters and/or technical functions of the automation device and/or the field device. In this case, the system described herein can provide that user inputs are made, for example, in order to select the tasks to be carried out from a series of technical tasks presented to a user.

It goes without saying that the data containing information about predefined technical tasks can be obtained from an internal resource of the computer on which the client is operated and/or from a data source remote from the computer on which the client is operated, using a data link, for example via the internet. In this context, the process of obtaining the data with the information about the predefined technical task can also be controlled and/or triggered using a user input, for example, by entering a query as to whether data concerning the technical task is to be obtained from a data source.

In particular, at least one of the access operations which the client is allowed to make to the automation device and/or the field device by the generated data objects, can be the reading and/or writing of a technical parameter and/or of the value of a technical parameter of a component of the machine and/or installation.

The access operations that typically need to be made to the automation device and/or the field device by the client using the generated data objects often consist in the reading and/or writing of a technical parameter of a component of the machine and/or installation. For example, an access operation can be a temperature that must not be exceeded and is therefore written to a field device that is used to monitor a temperature to enable the field device to perform an appropriate function, such as triggering an alarm, when the temperature is exceeded. However, the parameter can also be an actual temperature that is to be read out—for example for diagnostic purposes. For example, the client can thus be enabled to read a temperature from a field device that was measured by the field device. Accordingly, at least one of the data objects generated on the server by the client depending on a technical task to be performed by calling a functionality offered by the server is a data object organized as a node of a node type for representing values in the information model of the server, where the value represented is a technical parameter of a component of the machine and/or installation. For example, the data object can be an OPC UA node of the "Variable" type, which represents the value of the technical parameter of the machine and/or installation.

The technical parameter is in particular a technical parameter of an electric drive system. The technical parameter can be, in particular, a control parameter, for example a PID parameter, a temperature, a rotation rate, a mechanical power, an electrical power, a voltage, a current strength, an acceleration, an angular acceleration, a position, an angular position, a path, a distance, an angle, a speed, an angular speed, a force and/or a torque.

The technical task may in particular be an action that deviates from the normal operation of the machine and/or installation. The deviating action may in particular be commissioning, inspection and/or maintenance of the machine and/or installation.

The system described herein for operating an automation system is particularly well suited in particular for achieving such technical tasks that deviate from the normal operation of the machine and/or installation. While for the pure normal operation of a machine and/or installation it would be possible in principle to identify the required data objects quasi-manually and to equip the server with an address space restricted to the necessary data objects quasi "ex works", such a procedure would always reach limits whenever other data objects are required in deviation from the normal operation in order to be able to access the automation device and/or the at least one field device using a client. Typical cases in which this may be the case are commissioning, inspection and/or maintenance operations of the machine and/or installation. For example, it may be necessary to read out and/or write values of technical parameters and/or technical parameters of the machine and/or installation, of which no knowledge is required in normal operation or which are typically not changed in normal operation. The values can be, for example, control parameters that are written during commissioning.

In particular, during an inspection and/or maintenance of the machine and/or technical installation, it may be necessary to read out values of technical parameters the exact knowledge of which can be dispensed with in normal operation and which are therefore not read out in normal operation, for example, in order to not stress the resources of the computer on which the server is operated.

It may also be necessary to access technical functions of the machine and/or installation that are typically not required in normal operation. The technical functions may be, for example, technical functions of the machine and/or installation that are used for calibration.

The system described herein can provide in particular that data objects no longer required for the further operation of the machine and/or installation, which have previously been generated on the server by calling the functionality offered by the server, are removed from the server by the client by calling a functionality offered by the server and/or by a functionality of the server executed automatically by the server.

In particular in connection with a technical task which constitutes an action that deviates from the normal operation, it is advisable to remove data objects that are no longer required from the address space of the server to make the resources used by the data objects available again. The removal of the data objects that are no longer required can be performed by the client calling a corresponding functionality offered by the server, which causes the removal of the data objects no longer required.

Alternatively and/or in addition, a functionality of the server automatically executed by the server may also be provided, which leads to the removal of the data objects from the server. For example, the server may be configured to remove the data objects previously created by the client on the server when the data link between server and client is disconnected. This can be advisable, for example, if the client is only temporarily connected to the server in order to perform a specific technical task, such as commissioning, inspection and/or maintenance of the machine and/or technical installation. In such a case, a corresponding functionality for removing the data objects, which is executed automatically by the server, can ensure that no data objects that are no longer needed are left on the server to use resources of the server after the technical task has been performed.

In particular, the system described herein may provide that a plurality of clients access the automation device and/or the at least one field device via the server simultaneously to allow, for example, an inspection, maintenance and/or commissioning to be performed using a client temporarily connected to the server, while another client, which may be permanently connected to the server, for example, is also connected to the server via a data link. Thus, for example, it is not necessary to disconnect a client in the form of a process master computer from the server while an inspection, maintenance and/or commissioning operation of the machine and/or installation is carried out on another computer using another client.

BRIEF DESCRIPTION OF DRAWINGS

Further practical embodiments and advantages of the system described herein are described below in connection with the drawings. In the drawings.

DETAILED DESCRIPTION OF VARIOUS EMBODIMENTS

Figure 1:
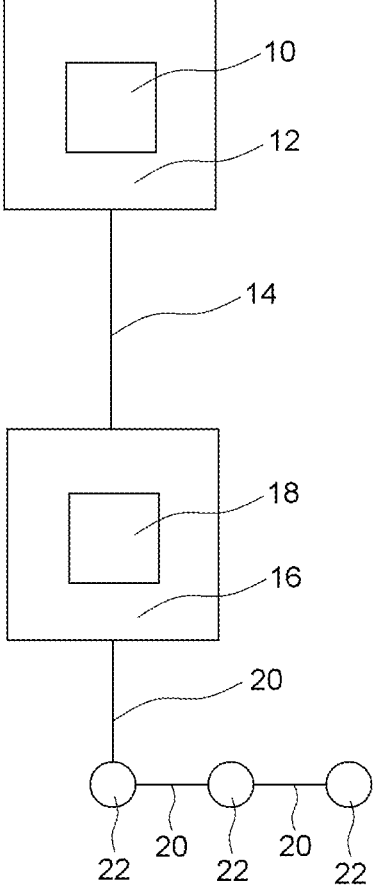
FIG. 1 shows a schematic illustration of an automation system.

In the exemplary automation system shown in FIG. 1, a client 10, for example an OPC UA client, is operated on a computer 12. The computer 12 is connected to an automation device 16 via a data link 14. The automation device 16 can be a control system, such as a programmable logic controller, for example. In the example shown, the automation device 16 has an embedded computer on which a server 18 is operated. The server can be, for example, an OPC UA server. Field devices 22 are connected to the automation device 16 using a fieldbus 20. The automation device acts, in particular, as the master in the fieldbus.

Figure 2:
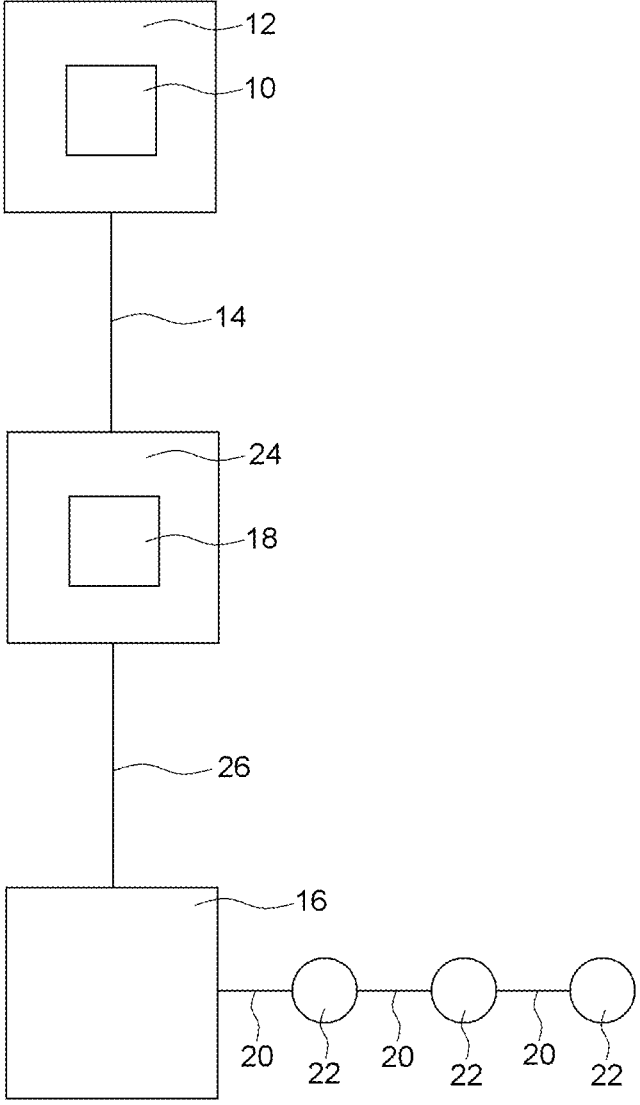
FIG. 2 shows a schematic illustration of an automation system according to an alternative embodiment.

FIG. 2 shows an alternative design of the automation system. The automation system differs from the automation system shown in FIG. 1 in that the data link 14 connects the computer 12, on which the client 10 is operated, to a computer 24 on which the server 18 is operated. The computer 24 is in turn connected to the automation device 16 via a data link 26.

Figure 3:
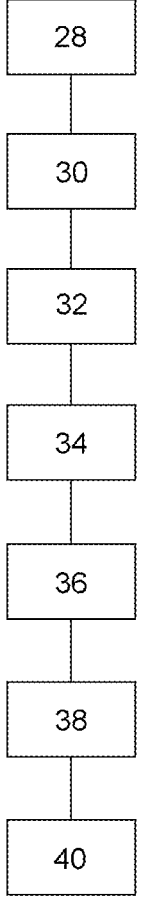
FIG. 3 shows an exemplary flow chart for operating the automation system.

FIG. 3 shows a schematic flow chart of an exemplary method that can provide, for example, that in a method step 28, a computer on which an OPC UA client is operated is first connected to an automation device on which an OPC UA server is operated.

In a next method step 30, the method can provide that the client 12 receives a return value with information about the type and/or address of the automation device and/or of the at least one field device by calling a functionality offered by the server 18.

In a further method step 32, the client 10 can obtain data matching the type of the automation device and/or of the at least one field device from a data source, which data contains information about addressable technical parameters and/or functions of the automation device and/or the at least one field device.

In a next method step 34, the method may provide that the determination and/or selection of the data objects to be generated is carried out by the client 10 depending on the technical task, on the data obtained, and/or on a user task, the purpose of which can be, for example, the selection of the technical task.

In a further method step 36, the data objects necessary for achieving the technical task are generated on the server 18 by the client 10 calling a corresponding functionality of the server 18, which causes the data objects to be generated.

The technical task is performed in a method step 38 that can be, for example, the maintenance, commissioning and/or inspection of a machine and/or technical installation. The performance of the technical task may in particular include the reading and/or writing of technical parameters of the machine and/or installation by access operations by the client, which are allowed to the client by the generated data objects.

Once the technical task has been performed, the removal from the server 18 of data objects that are no longer required can be carried out in a method step 40 that can be performed by the client 10 calling a corresponding functionality offered by the server 18. Alternatively and/or in addition, a functionality executed automatically by the server 18 can cause the removal of the data objects, which can be triggered, for example, by disconnecting the data link between the client 10 and server 18.

It goes without saying that the method may provide for further method steps to be carried out between the method steps described above. The further method steps can serve, for example, to initialize interfaces or similar.

The features of the invention disclosed in the present description, the drawings and the claims can be essential to the implementation of the invention in its various embodiments, both individually and in any combinations. The invention is not limited to the embodiments described. The invention may be varied within the scope of the claims and taking into account the knowledge of the relevant person skilled in the art.

The invention claimed is:

1. A method for operating an automation system of a machine or an installation, comprising:

a client process, executed on a computer, accessing an automation device of the automation system via a server coupled to or integrated with the automation device and separate from the computer used for the client process, wherein address information for accessing the automation device is provided by the server in an address space in the form of data objects that are organized in the form of nodes of a meshed network in an information model of the server;

the client process calling a functionality offered by the server based on a technical task to be performed; and the client process automatically creating data objects on the server by calling the functionality offered by the server to allow the client process to access the automation device and/or at least one field device, networked with the server and/or the automation device via a fieldbus, that are necessary to achieve the technical task, wherein depending on the technical task, the client process automatically determines and/or selects particular ones of the data objects that are to be created on the server in order to achieve the technical task and wherein the client process accesses data containing information about predefined technical tasks, the data being information about the technical parameters and/or technical functions of the machine and/or installation that are accessed to achieve the technical task.

2. The method as claimed in claim 1, wherein accessing the automation device includes reading and/or writing a technical parameter of a component of the machine and/or installation and/or access to a technical function of the component of the machine and/or installation.

3. The method as claimed in claim 1, wherein the client process, by calling a functionality offered by the server, receives a return value from the server with information about a type and/or address of the at least one field device in the fieldbus.

4. The method as claimed in claim 1, wherein the client process obtains data from a data source that matches a type of the automation device and/or a type of the at least one field device.

5. The method as claimed in claim 1, wherein the client process performs a determination and/or selection of the data objects to be generated depending on the technical task, the data obtained, and/or a user input.

6. The method as claimed in claim 1, wherein the functionality offered by the server is provided by the server as a service and/or a data object in the address space of the server, which is organized as a node of the meshed network in the information model of the server.

7. The method as claimed in claim 1, wherein the client process determines a type and/or address of the at least one field device using an iterative technique that provides that the client process generates data objects on the server that are suitable for enabling access to a particular type of field device, and, by calling the data objects for test purposes, the client process checks whether the at least one field device is a field device of the particular type.

8. The method as claimed in claim 1, wherein the client process determines a type of the fieldbus using an iterative technique that provides that the client process generates data objects on the server that are suitable for enabling access to an automation device with connection to a particular type of fieldbus and/or to a particular field device via the particular type of fieldbus and by calling the data objects for test purposes, the client process checks whether the fieldbus is a fieldbus of the particular type.

9. The method as claimed in claim 1, wherein the client process determines a version of a firmware of the at least one field device using an iterative technique that provides that the client process generates data objects on the server that are suitable for enabling access to afield device with firmware of at least one specific version, and by calling the data objects for test purposes, the client process checks whether the firmware of the at least one field device is a firmware of the at least one type.

10. The method as claimed in claim 1, wherein at least one of the data objects generated on the server by the client process depending on a technical task to be performed by calling a functionality offered by the server is a data object organized as a node of a node type for representing values in the information model of the server and wherein the value represented is a value of a technical parameter of a component of the machine and/or installation.

11. The method as claimed in claim 1, wherein the technical parameter is a technical parameter of an electric drive system.

12. The method as claimed in claim 1, wherein the technical task is an action that deviates from normal operation of the machine and/or installation.

13. The method as claimed in claim 1, wherein data objects no longer required for further operation of the machine and/or installation, which have previously been generated on the server by calling the functionality offered by the server, are removed from the server by the client process by calling a functionality offered by the server and/or by a functionality of the server executed automatically by the server.

14. The method as claimed in claim 1, wherein the server is an Open Platform Communications Unified Architecture (OPC UA) server and the data objects are OPC UA nodes.

15. The method as claimed in claim 3, wherein the client process receives a return value from server with information about types and/or addresses of all field devices in the fieldbus.

16. The method as claimed in claim 4, wherein the data from the data source contains information about addressable technical parameters and/or functions of the automation device and/or the field device.

17. The method as claimed in claim 6, wherein the node is a node type for representing methods.

18. The method as claimed in claim 7, wherein, if the result of the check does not allow for a unique identification of the type and/or address of the field device, the client process removes the data objects and replaces the data objects with other data objects that are suitable for enabling access to a field device of at least one further specific type, and repeats the check.

19. The method as claimed in claim 8, wherein, if the result of the check does not allow for a unique identification of the type of the fieldbus, the client process removes the data objects and replaces the data objects with other data objects that are suitable for enabling access to an automation device with connection to a fieldbus of at least one further specific type and/or to a field device via a fieldbus of the at least one further specific type, and repeats the check.

20. The method as claimed in claim 9, wherein, if the result of the check does not allow for a unique identification of the version of the firmware, the client process removes the data objects and replaces the data objects with other data objects that are suitable for enabling access to a field device with firmware of at least one further specific version, and repeats the check.

21. The method as claimed in claim 11, wherein the technical parameter is a control parameter corresponding to at least one of: a PID parameter, a temperature, a rotation rate, a mechanical power, an electrical power, a voltage, a current strength, an acceleration, an angular acceleration, a position, an angular position, a path, a distance, an angle, a speed, an angular speed, a force and/or a torque.

22. The method as claimed in claim 12, wherein the technical task is one of: a commissioning, an inspection and/or maintenance of the machine and/or system.

23. The method as claimed in claim 22, wherein the client process is temporarily networked with the server to perform the technical task.

24. The method of claim 1, wherein the server is an embedded computer.

25. The method of claim 24, wherein the server is embedded in the automation device.

* * * * *